No. 690,518. Patented Jan. 7, 1902.
A. J. FRITH.
CONVEYER.
(Application filed July 6, 1901.)

(No Model.) 6 Sheets—Sheet 1.

Witnesses
J. T. Rooney
James H. Barr

Inventor
Arthur J. Frith
By his Attorney
Francis P. Reilly

No. 690,518. Patented Jan. 7, 1902.
A. J. FRITH.
CONVEYER.
(Application filed July 6, 1901.)
(No Model.) 6 Sheets—Sheet 2.
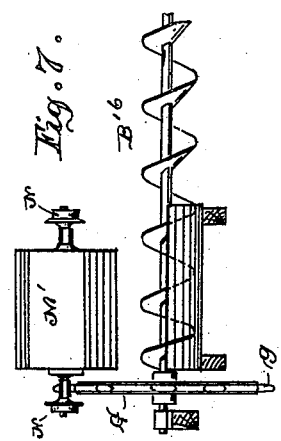
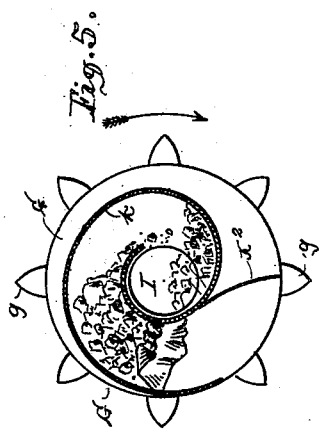
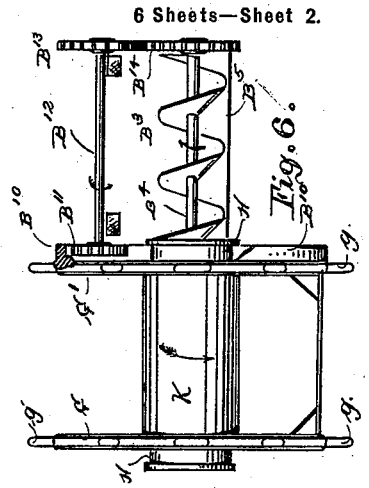
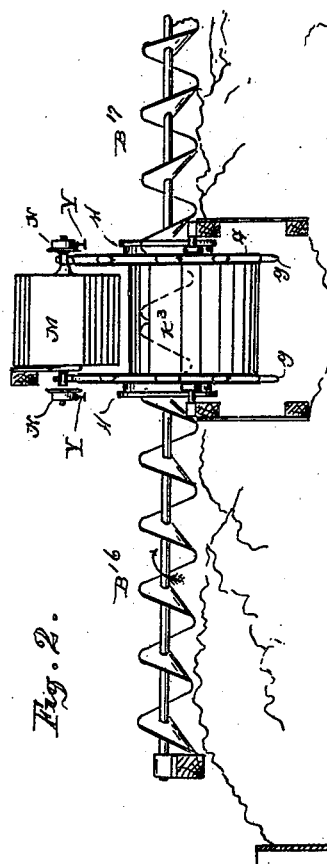
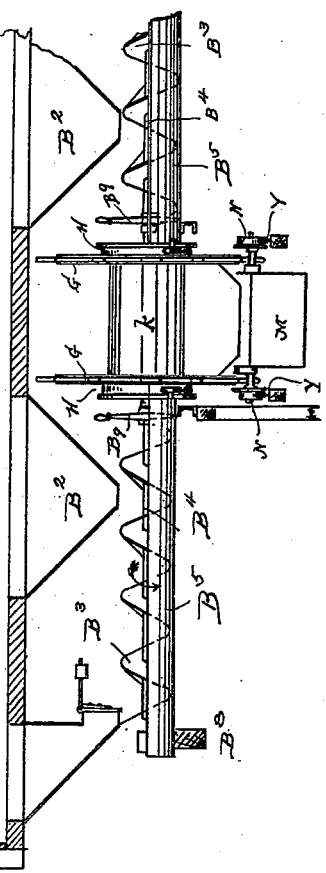

No. 690,518.

A. J. FRITH.
CONVEYER.
(Application filed July 6, 1901.)

Patented Jan. 7, 1902.

(No Model.)

6 Sheets—Sheet 3.

Witnesses
J. T. Rooney
James G. Barr

Inventor
Arthur J. Frith,
By his Attorney
Francis P. Reilly

No. 690,518. Patented Jan. 7, 1902.
A. J. FRITH.
CONVEYER.
(Application filed July 6, 1901.)

(No Model.) 6 Sheets—Sheet 4.

Witnesses
J. T. Rooney
James G. Barr

Inventor
Arthur J. Frith,
By his Attorney
Francis P. Reilly

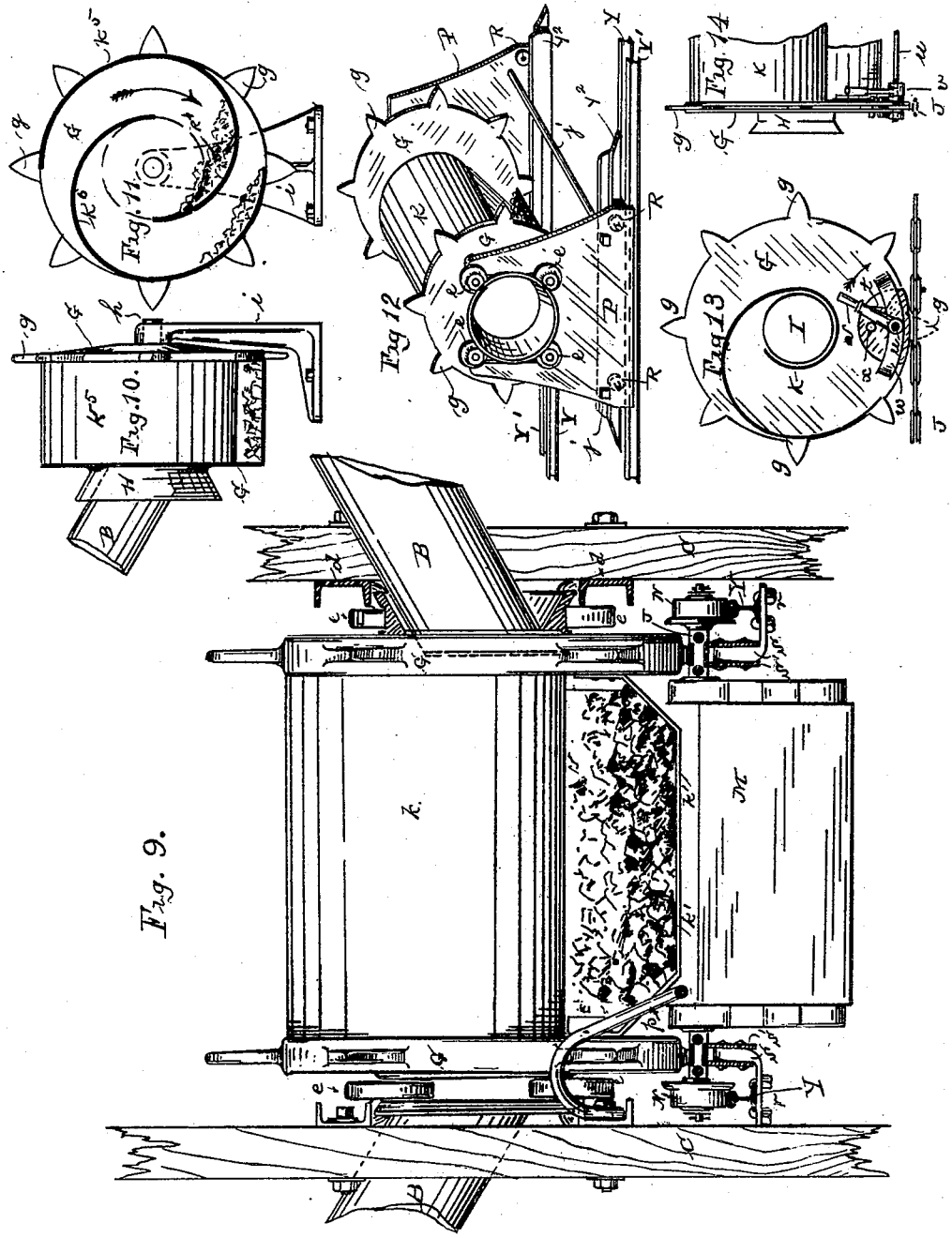

No. 690,518. Patented Jan. 7, 1902.
A. J. FRITH.
CONVEYER.
(Application filed July 6, 1901.)
(No Model.) 6 Sheets—Sheet 6.

Witnesses
J. T. Rooney
James J. Barr

Inventor
Arthur J. Frith
By his Attorney
Francis P. Reilly

UNITED STATES PATENT OFFICE.

ARTHUR J. FRITH, OF NEW YORK, N. Y.

CONVEYER.

SPECIFICATION forming part of Letters Patent No. 690,518, dated January 7, 1902.

Application filed July 6, 1901. Serial No. 67,267. (No model.)

*To all whom it may concern:*

Be it known that I, ARTHUR J. FRITH, of the borough of Manhattan, in the city, county, and State of New York, have invented certain new and useful Improvements in Conveyers, which invention is fully set forth and illustrated in the following specification and accompanying drawings.

The object of this invention is to provide simple and efficient means for loading conveyers having buckets so that each bucket in turn may be loaded with the coal, ashes, or other material to be conveyed without spilling such material between the buckets. It is also its object to provide means for conveying material to the loading devices and for disposing of the material discharged by the buckets, thus enabling material to be loaded into the buckets from a distant point and when discharged to be spread over a large surface area; and it is also its object to so construct the conveyer that it may be employed for conveying two or more different materials simultaneously in alternate buckets, which materials can be discharged at an appropriate point or points.

The invention will first be described in detail and then set forth in the claims.

Figure 1:
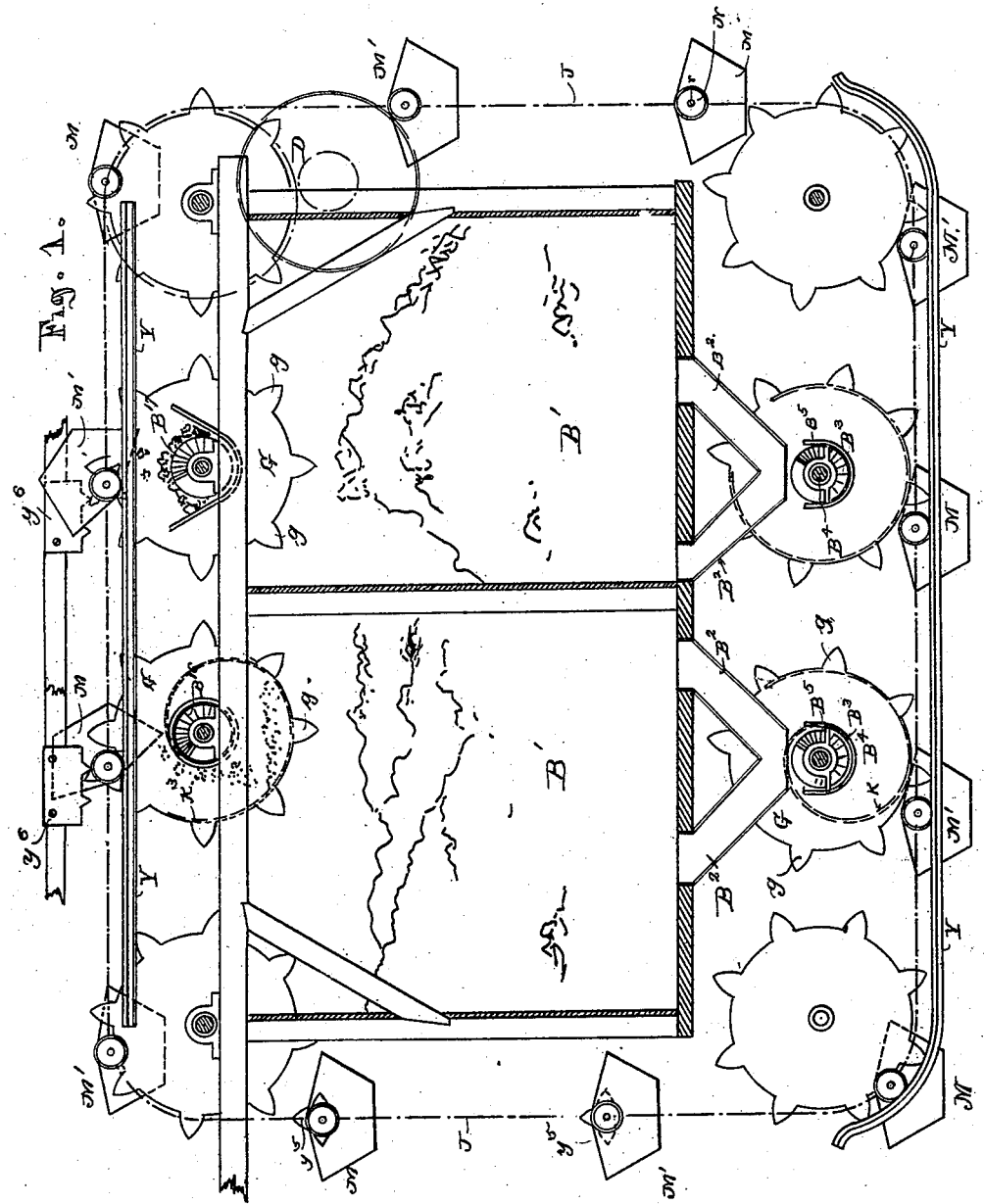
Figure 4:
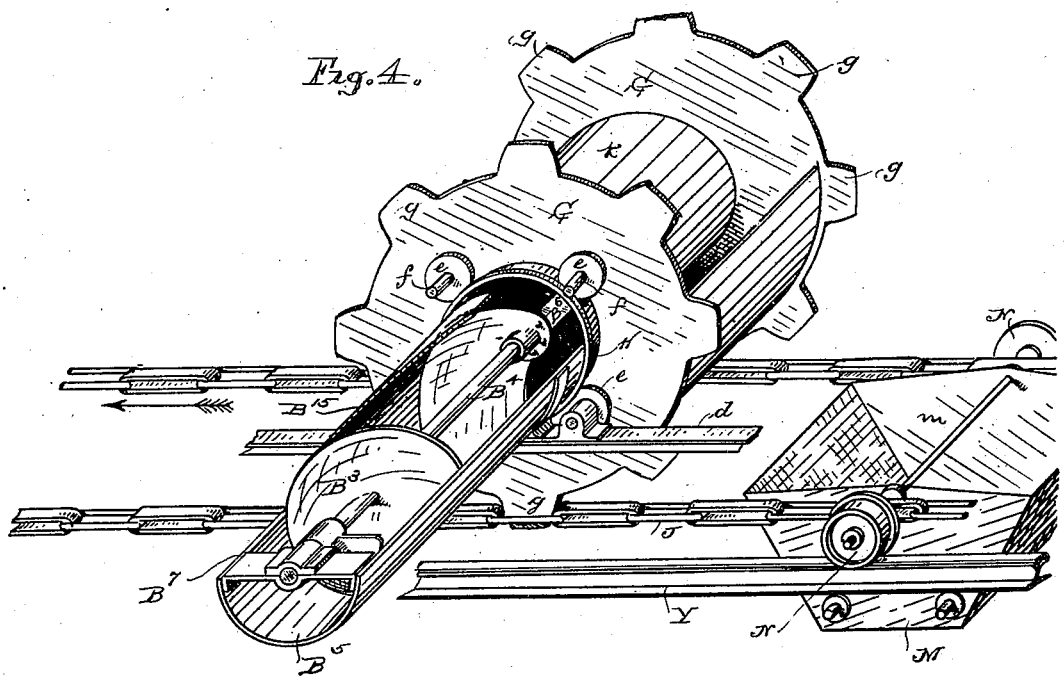
Figure 3:
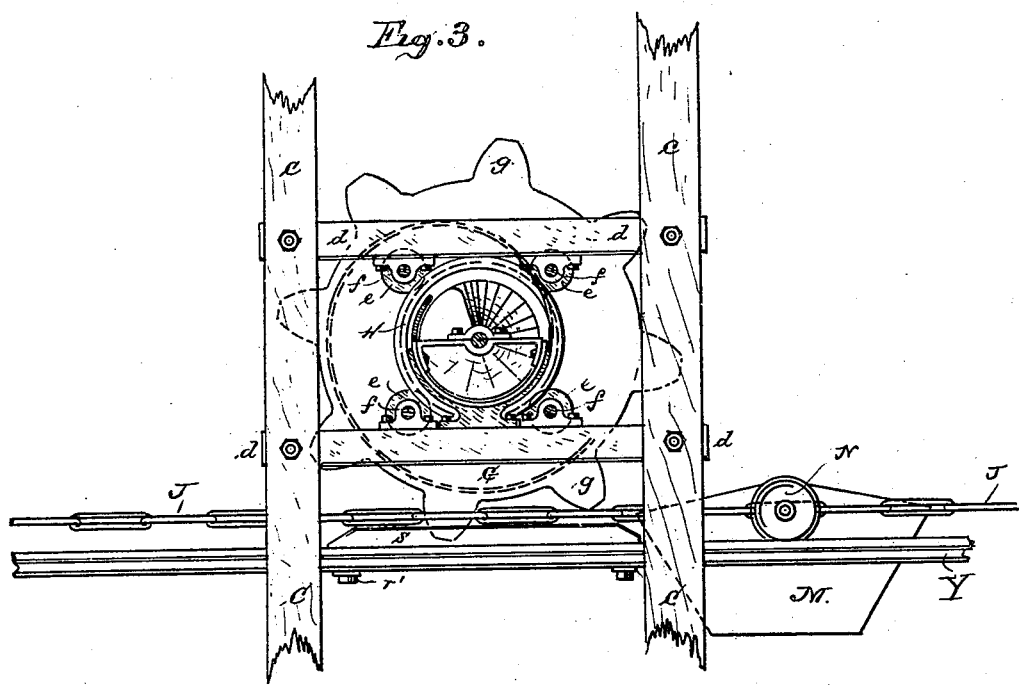
Figure 8:
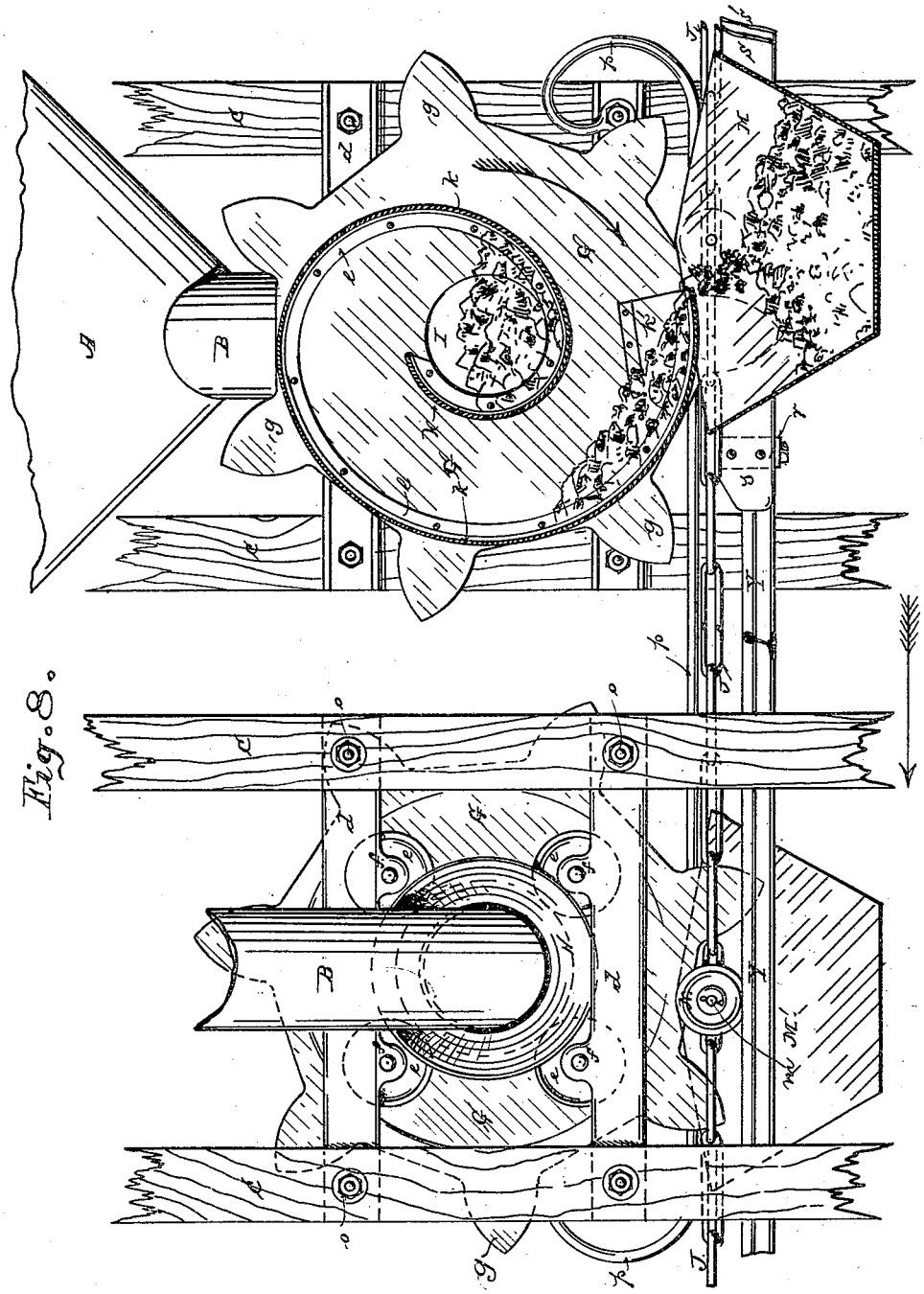
Figure 15:
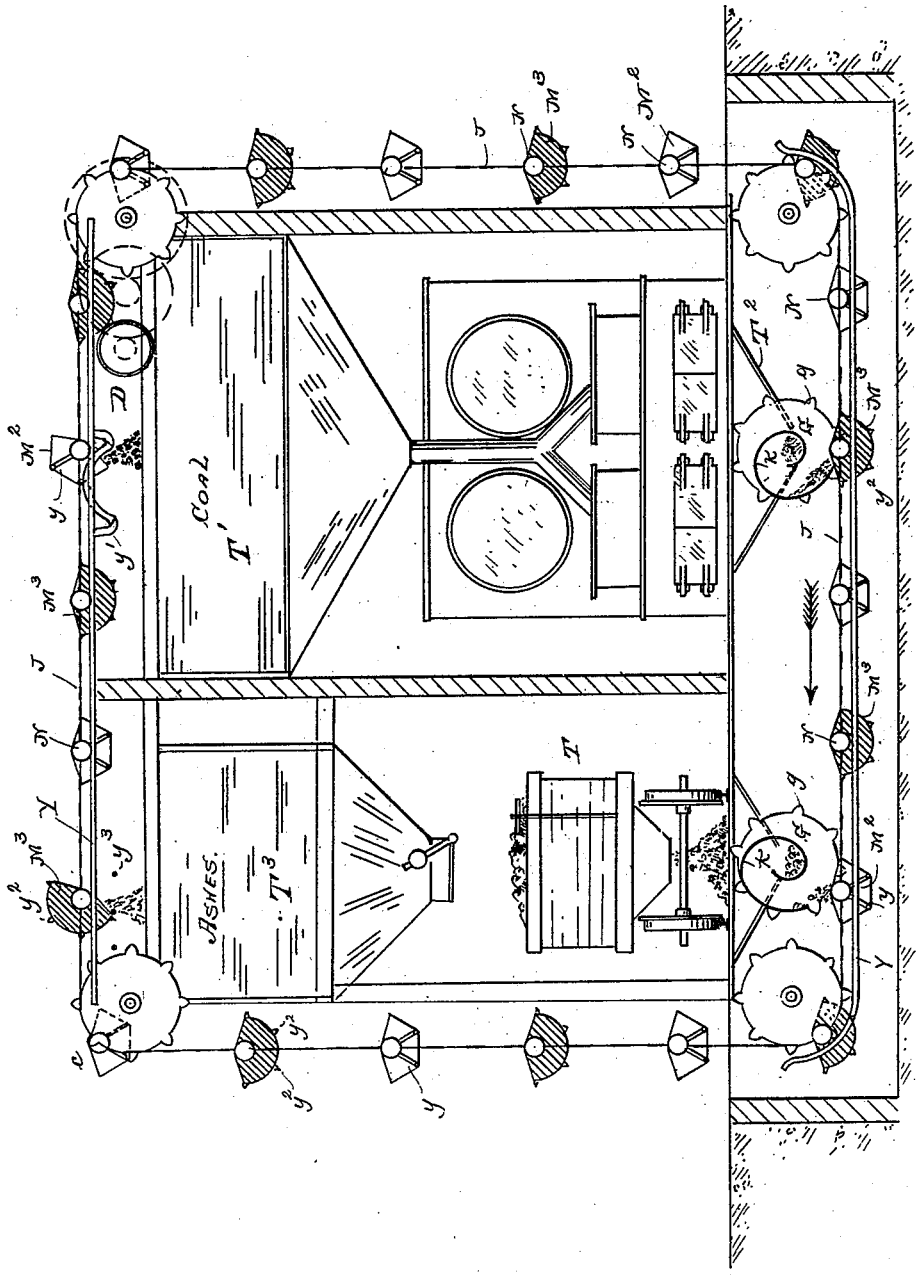

In the accompanying drawings, Figure 1 is a view in side elevation, partly in section, of a conveyer embodying certain of my improvements. Two loading devices are shown for loading alternate buckets with material conveyed to such loaders by screw conveyers from two storage-bins, and two discharging devices are shown for receiving the material discharged by the buckets and conveying it to desired points. Fig. 2 is an end elevation of Fig. 1, partly in section. Fig. 3 shows in sectional elevation, upon an enlarged scale, one of my rotary loaders and its feeding-conveyer mounted in supporting-frames. Fig. 4 shows one of said rotary loaders in perspective, the supporting-frames and certain other details being omitted in order to more clearly illustrate the remaining parts. Fig. 5 is a sectional elevation of one of my spiral loaders, illustrating a detail of construction hereinafter described. Fig. 6 is a view in sectional elevation, showing means for increasing the speed of the feeding screw conveyer which feeds the rotary loader. Fig. 7 is a view in sectional elevation, detached, of the receiving screw conveyer which is shown at the right of Fig. 1 as receiving material discharged from the buckets. Fig. 8 is a sectional side elevation, upon an enlarged scale, of a portion of a conveyer in which two of my rotary spiral loaders are shown as being fed with material by hoppers and chutes instead of by screw conveyers, as in Figs. 1, 2, and 3. Fig. 9 is an end elevation of Fig. 8 looking to the left. Figs. 10 and 11 show in elevation and in section, respectively, a modified form of my spiral loader. Fig. 12 is a view in perspective, showing the spiral loader mounted so as to be movable to different places. Figs. 13 and 14 illustrate in sectional elevation and end elevation, respectively, a method of throwing the loading device into and out of gear with the conveyer-chain. Fig. 15 is a view in side elevation, partly in section, of a conveying apparatus embodying my improvements applied to a boiler plant for the double purpose of supplying coal to the furnaces and conveying ashes therefrom, two of my improved spiral loaders being shown in position.

In said figures my invention is shown as applied to a gravity bucket conveyer, although my invention is applicable to other forms of conveyer.

The letter J indicates two parallel conveyer-chains, which are arranged in the usual manner to form endless flexible connections between the buckets M M' M² M³. Each bucket is suspended between the chains J by means of an axle or pivot $m$, provided on its ends with track wheels or rollers N, which run upon track-rails Y, suitably supported in the framework of the conveyer.

The conveyer may be driven by any suitable mechanism located at the point D, Fig. 1, or any other convenient point.

The letter $c$ indicates vertical timbers forming part of the conveyer-frame and connected together by cross-pieces $d$. Mounted in said cross-pieces by means of pivots $f$ is a series of small rollers $e$. Four or any other desired number of said rollers may be provided at each side of the conveyer to form bearings for the hollow necks H of my rotary loading-chute. Said loading-chute is constructed, as clearly shown at the left of Fig. 1 and in Figs. 4 and 8, from a single plate or sheet of metal K by rolling or bending the sheet upon itself to form a spiral casing or spiral chute with a single discharge-opening. When formed into the proper shape, said spiral chute is secured, by means of angle-bars $l$, Fig. 8, to two side pieces G, each provided with teeth or projections $g$ for engaging the links of the conveyer-chain J. The side pieces G are each provided with an opening I and with a hollow neck H, by means of which necks the loader is supported upon the rollers $e$, as above described. Said necks H also serve the purpose of enabling material to be deposited in the loader, and if, as shown in Figs. 2 and 9, a hollow neck H be provided at each side material may be deposited in the loader and loaded into the buckets from either side of the conveyer, a method of loading which is very advantageous under some circumstances and which cannot be adopted with rotary loaders supported upon a side shaft. It is evident, however, that one of the necks H may be closed, if desired, and material be deposited in the loader from one side only.

For the purpose of delivering into the rotary loader the material to be conveyed I have shown in Figs. 8 and 9 two side chutes or spouts B, leading from hoppers A and entering the hollow necks H of the loader, the material being placed in said hoppers by hand or by other suitable means.

In Figs. 1, 2, 3, and 4 I have illustrated another method of delivering material into the loader, which method will be found very advantageous in many cases. In said figures a gravity bucket conveyer is shown having two rotary loaders, the buckets being so spaced apart and the loaders being so proportioned that each loader will load an alternate bucket of the conveyer with material from storage bins or pockets B'. Said bins may contain the same kind of material, or a different material may be contained in each bin. The bottom of each bin B' is provided with a discharge-spout $B^2$, which discharges the material into a screw conveyer $B^3$, supported on a shaft $B^4$ within a trough or casing $B^5$, the inner end of the trough $B^5$ being supported by the hollow neck H of the loader and its outer end by a suitable support, as at $B^8$, Fig. 2. The outer end of the shaft $B^4$ may be supported, as shown in Fig. 4, in a bearing $B^7$, carried by the trough $B^5$, and the inner end of said shaft may be rigidly secured to a bar $B^6$, which is secured to the side piece G of the loader and extends across the opening I. The screw conveyer $B^3$ being thus rigidly connected with the rotary loader, it is evident that the rotation of the loader will effect the rotation of said screw conveyer. To accomplish the same result and to permit of the loader and screw conveyer being disconnected, any suitable form of clutch may be provided between the loader and the screw conveyer, as indicated at the point $B^9$, Fig. 2. Each of the rotary loaders shown in Figs. 1 and 2 is shown as provided with a screw conveyer $B^3$ at each side, and said conveyers may all be provided with clutches $B^9$ for connecting them with and disconnecting them from the loaders.

As it may be necessary in some cases to increase the speed of the feeding-conveyers $B^3$ in order that sufficient material will be fed into the loader to load the buckets, any suitable means may be provided to accomplish this result. One method is illustrated in Fig. 6, where one side piece G' of the loader is shown provided with an internal gear $B^{10}$, which engages a pinion $B^{11}$ on a shaft $B^{12}$. The shaft $B^{12}$ carries on its outer end a gear-wheel $B^{13}$, engaging a gear $B^{14}$ on the outer end of the screw-conveyer shaft $B^4$, the inner end of said shaft $B^4$ being loosely mounted in a suitable bearing in the hollow neck H of the loader. It will thus be seen that as the loader K rotates the feeding-conveyer $B^3$ will be driven at a greater speed through the gear $B^{10}$, pinion $B^{11}$, gears $B^{13}$ $B^{14}$, and shafts $B^{12}$ $B^4$.

The discharge-opening of the spiral chute K may have secured thereto, if desired, as shown in Figs. 8 and 9, a metal plate K', which will form a loading channel or spout for guiding the material into the buckets of the conveyer. Said chute may also have secured thereto, as shown in Fig. 5, a deflector $K^2$ to guide the material.

The casing $B^5$ of each feeding-conveyer $B^3$ may be provided, as shown in Fig. 4, with a curved guard-plate $B^{15}$, so that in case a lump of material should be deposited in the screw conveyer which is too large to pass through the opening I into the loader said lump will be thrown out of the screw conveyer over the side of the trough $B^5$ by said guard-plate.

Guard-rails $p$ may be secured to the framework $c$ of the conveyer above the buckets for the purpose of preventing their oscillation during the loading operation.

In Fig. 1 I have shown two rotary loaders for loading the buckets, the one at the left being a spiral chute formed from a single plate of metal, as above described. The loader at the right is also formed from a single plate of metal, but instead of being bent into spiral form is bent to form a cylindrical casing or chute with a single discharge-opening. This loader is mounted, fed, and operated in the same manner as the spiral loader.

For the purpose of effecting the discharge and distribution of the material conveyed by the buckets I have shown at the top of Fig. 1 two different means at different points. At the left of said figure is shown a spiral chute $K^3$, located below the line of travel of the buckets and having connected to each of its side openings a screw conveyer $B^{16}$. The spiral chute $K^3$ and the screw conveyers $B^{16}$ are exactly similar in construction and operation to the spiral chute K and screw conveyers $B^3$ shown at the loading-point on the lower level of the conveyer, except that they are caused to rotate in the opposite direction. At the right of Fig. 1 the spiral receiving-chute $K^3$ is shown as dispensed with; but its side pieces G are retained to effect the rotation of a screw conveyer $B^{17}$, which extends beneath the line of travel of the buckets, as clearly shown in Fig. 7. Each bucket of the conveyer is provided on one of its sides with a gear $y^5$, the gears on adjacent buckets being on opposite sides. Above the conveyer and in the line of travel of the buckets are set at different points on opposite sides of the track two dumping-bars $y^6$, each provided with teeth or projections adapted to engage the gears $y^5$ on the buckets and by tilting the buckets backward upon their pivots cause the material contained in alternate buckets to be discharged into the receiving-chute $K^3$ at the left and directly into the screw conveyer $B^{16}$ at the right.

The operation of the parts as shown in Figs. 1, 2, 3, 4, 8, and 9 is as follows: In Figs. 1, 2, and 8 I have shown, as above described, two rotary loaders applied to a conveyer; but referring first to Fig. 8 and assuming that only one loader be used—say the one at the right of said figure—it will be evident that coal or other material deposited in the hoppers A will flow through the chutes B, hollow necks H, and openings I into the center of the spiral loading-chute K. As the conveyer travels the conveyer-chain J will engage the teeth $g$ on the sides of the loader, and thus cause the loading-chute K to revolve in the direction of the arrow, the result being that as said chute continues its revolution the material deposited in the center thereof will follow the spiral and be discharged through the discharge-opening into the bucket M, which will be beneath said opening. As said spiral chute continues its revolution the supply of material to the buckets is thereby cut off and no material can escape until the next bucket has come into proper position beneath the loader. As shown in Fig. 8, the spiral loader is discharging one load into a bucket and is receiving another load into its center from the hopper A, which latter load will be delivered at the next revolution into the next succeeding bucket if the parts be properly proportioned. The material thus loaded into the buckets is conveyed by them to the desired point and there discharged in any well-known manner. If instead of feeding material to the loader through the hopper A and chutes B the feeding screw conveyers $B^3$, Figs. 1, 2, 3, and 4, be used for this purpose, it is evident that material deposited into said screw conveyers will as the conveyer travels be delivered into the center of the loader from each side of the conveyer, the rotation of the loader effecting the rotation of said feeding-conveyers by the mechanism hereinbefore described. The material is then loaded into the buckets by the loader in the same manner as above described. Assuming now that instead of loading each bucket of the conveyer at the same point it be desired to load the buckets at different points either with the same material or with different materials, then I arrange the conveyer as shown in Figs. 1, 2, and 8 by placing two loaders side by side and so spacing the buckets apart that each of said loaders will load an alternate bucket with material. Thus if the conveyer be traveling in the direction of the arrow, Fig. 8, the bucket M will receive a load of one kind of material from the loader at the right, while the bucket M' (which has passed the right-hand loader without receiving a load) will receive a load of another kind of material from the loader at the left. The bucket next following the bucket M will pass the right-hand loader without receiving a load and will be loaded by the loader at the left, and so on, the two loaders being continuously operated by the movement of the conveyer.

In Fig. 1 the two loaders are shown applied to the loading of material from storage bins or pockets B', which may contain different materials, if desired. The material flowing through the chutes $B^2$ at the bottoms of said bins falls into the feeding screw conveyers $B^3$ and is automatically fed by the rotation of said conveyers into both sides of each loader, and each loader as the conveyer travels loads an alternate bucket with said material. The buckets then convey the material or materials to the upper level of the conveyer and are then discharged of their contents by being tilted backward upon their pivots when the dumping-gears $y^5$ come in contact with the fixed dumping-bars $y^6$. The contents of one bucket M' will be delivered into the screw conveyer $B^{17}$ at the right. The contents of the following bucket M will be delivered into the single opening of the rotary spiral chute $K^3$ and by the rotation of said chute be discharged through its side openings into the attached screw conveyers $B^{16}$. The screw conveyers $B^{16}$ $B^{17}$ will then convey the material horizontally and deposit it at the desired points. With this system, therefore, by providing feeding-conveyers at each side of the loader and discharging-conveyers at each side of the dumping-point material may be fed into the conveyer from distant points on each side, and when discharged may be spread over a large surface area, thus enabling storage bins or pockets to be constructed comparatively shallow, but of great length or width.

In Fig. 15 I have shown my invention embodied in an endless gravity bucket conveyer and applied to a boiler plant, so that a single conveyer performs the double function of simultaneously conveying coal to the furnaces and of discharging ashes therefrom. In this illustration of my invention I have shown one of my spiral loaders or chutes K receiving coal from a car T and loading it into the angular buckets $M^2$ of the conveyer, which convey and deliver it into a hopper T', leading to the boiler-furnaces. At the same time the alternate semicylindrical buckets $M^3$ of the conveyer are loaded with ashes from a chute T² beneath the furnaces by another of my spiral loaders and convey such ashes to a receiving hopper or receptacle T³, into which said buckets discharge. To effect the discharge of coal from the angular buckets M², I have shown said buckets provided with cams or projections $y$ on their sides, which by coming in contact with a cam $y'$, placed at the side of the track above the hopper T', tilt said buckets on their pivots and discharge the coal into said hopper. To effect the discharge of ashes from the semicylindrical buckets M³, I have shown said buckets provided on their bottoms with projections $y^2$, which by coming in contact with transverse rods $y^3$, fixed above the receptacle T³, effect the tilting of said buckets M³ and the discharge of the ashes into said receptacle. By thus providing different dumping devices for alternate buckets each alternate bucket will be discharged at its appropriate point, as it will be evident that the buckets M² will pass the dumping device $y^3$ without interference and that the buckets M³ will likewise pass the dumping-cam $y'$ without interference. It is obvious that the same effect can be produced by providing the cams $y$ alternately on opposite sides of the buckets and placing a cam $y'$ on each side of the track at different points. Hence I do not confine myself to the use of any particular means for effecting the discharge of the contents of the buckets, as any suitable means may be employed for this purpose.

By my invention, therefore, if the loading devices and the buckets of a conveyer be properly arranged in relation to each other the loading devices will be operated by the conveyer and alternate buckets of a single conveyer will be loaded with and caused to convey two or more different materials simultaneously, which materials may be discharged at any desired point or points in the conveyer's line of travel. My invention also presents the advantage that different kinds of buckets may be employed for the different materials to be conveyed. Thus, for example, the buckets M³ (shown in Fig. 15) for conveying the ashes may be made of malleable metal, as hot ashes have been found to be destructive of the usual conveyer-buckets.

In view of the fact that I believe myself to be the first person to load alternate buckets of a gravity bucket conveyer by a loading device or devices operated by the conveyer and to discharge such buckets alternately at any desired point or points in the line of travel of the conveyer I do not in regard to this feature of my invention limit myself to the particular forms of loading and discharging devices shown, as it is evident that these devices may be modified to accomplish the same result without departing from the essence of my invention, and, further, as I believe myself to be the first to feed material by means of a conveying device into a bucket-loader which is operated to load the buckets I do not limit myself to the specific constructions of loaders shown in Fig. 1, as it is evident that the feeding-conveyers may be used to feed other forms of bucket-loaders than those shown.

The means shown for effecting the operation of the several parts, so that each will perform its proper function at the proper time, may be varied without departing from my invention; but in order to insure certainty in operation I prefer to derive the necessary motion directly from the moving conveyer.

In Figs. 10 and 11 I have shown a double spiral chute constructed from two sheets of metal instead of from a single sheet. The two flat sheets of metal K⁵ K⁶ are simply rolled or bent upon themselves into the spiral form shown and are secured to two side pieces G G, one of which is provided with the hollow neck H for the reception of the chute B and the other closed and provided with teeth or projections $g$ for engaging the conveyer-chain. When thus secured together, the device forms a double chute, each with a single discharge-opening, and may be mounted upon a short shaft $h$, rotating in bearings carried by a standard $i$, supported by the conveyer track-rails or by the conveyer-framework. It is obvious, however, that this double spiral chute instead of being supported by the shaft $h$ may be provided with and supported by a hollow neck or necks H in the same manner as the single spiral chute hereinbefore described. The principle of operation of this double spiral loader is the same as that shown in Figs. 1, 8, and 9; but if made the same size as the loader shown in these figures the buckets in the conveyer will be placed closer together by reason of the loader being double. In Fig. 11 the loader is shown as rotating in the direction of the arrow and discharging the material from one of its spirals, while the other spiral is receiving a load from the chute B to be discharged into the next bucket of the conveyer on the next revolution of the loader.

By referring to Fig. 5 it will be seen that the area of the spiral passage in the loader gradually expands toward the discharge-opening, thus facilitating the discharge of material and lessening the chances of the material jamming in such opening. In Fig. 11 the spiral passages in the loader may, if desired, be similarly increased in area at the discharge-opening by bending the plates K, as indicated by dotted lines K⁴, or in any other suitable manner.

It is frequently desirable that the loading device used to load a conveyer should be capable of being moved to different points in the conveyer's line of travel, and to accomplish this I have shown in Fig. 12 one of my spiral loaders mounted in standards P, which are connected together by tie-rods $j$ and are provided with rollers or wheels R, running on supplemental rails Y', parallel with the main track-rails Y. The loader is thus adapted to be moved from place to place, as may be desired.

In Fig. 12 I have also shown short auxiliary rails Y², mounted upon the track-rails Y at the loading-point and provided with inclined ends. The track-wheels N of the buckets mount these short auxiliary rails, and thus bring the conveyer-chain into position to engage the teeth $g$ of the loader and effect the rotation of the latter. By this construction the loader may be thrown out of operation at any time that it may be desired to stop loading therefrom, as it is only necessary to remove the short auxiliary rails Y², and thus throw the teeth $g$ and conveyer-chain J out of gear.

In Figs. 13 and 14 I have shown another method by which the loader may be thrown out of operation at any desired time. In this modification I make one of the teeth $g$ of each side piece G movable within a recess $t$ formed in said side piece, and secure these teeth to the ends of a transverse rod or shaft $u$, provided with a lever or handle $v$. It will be obvious that by moving the handle $v$ in one direction or the other the teeth $g$ will be thrown into or out of gear with the conveyer-chain, as may be desired. In Figs. 13 and 14 (Fig. 13 being a sectional elevation looking from the right of Fig. 14) the movable tooth $g$ is shown thrown out of gear with the conveyer-chain, and hence the travel of said chain will not rotate the spiral loader. When it is desired to operate the loader, it is only necessary to depress the lever $v$ in the direction of the arrow, Fig. 13, and the movable teeth $g$ (one on each side of the conveyer) will be thrown into gear with the conveyer-chain, as shown in dotted lines, thus resuming the rotation of the loader. A support $w$ may be provided for the shaft $u$ and the tooth $g$ and a stop-pin $x$ to limit the movement of the lever $v$. Care should be taken to throw the movable tooth into the proper link of the chain, so as not to affect the register of the loader, and, if desired, any suitable means may be provided to insure the proper relation of the parts being attained.

In conveyers in which the buckets are spaced apart there is a liability of the conveyer-chain slacking or sagging between the buckets, and should this occur at the loading-point the teeth or projection on the loading device might skip a link in the chain, thus throwing the loader out of register and causing it to deposit material outside of the buckets, and an accumulation of such material might result in a jam of the buckets and other parts and cause serious damage. To obviate this difficulty, I provide on each side of the conveyer at the loading-point, as shown in Figs. 3, 8, and 9, two parallel rails or bars S S', secured to the brackets $r$, which are carried by the conveyer track-rails. The conveyer-chain J rests and travels upon these bars while passing the loading-point, and said bars form a supporting-guide for the chain and insure its proper contact with the teeth $g$ of the loader, which teeth engage the links of the chain and enter the channel formed between said bars. This supporting-guide for the conveyer-chain may be used at any point in the conveyer where it may be desirable to hold the chain in position to engage an operating mechanism.

From the above description it will be apparent that a conveyer embodying my improvements presents many advantages. The use of a rotary loading chute or casing having but a single discharge-opening for loading the buckets permits the buckets to be spaced very far apart, so that in a given length of conveyer the expense of buckets is very materially decreased and a saving in cost of installation effected. The loading device may be economically manufactured, is of extremely simple construction, has no movable parts to be clogged, broken, or deranged in operation, and is operated easily and with certainty by the conveyer. It also acts as a measure for the material to be conveyed, receiving from the feeding devices and delivering into the buckets at each revolution a measured charge of material, preventing overloading of the buckets and the escape of material between them. Its construction renders unlikely the stoppage of the flow of material by jamming; but should a stoppage occur at the discharge-opening of the spiral the loader would not stop, but would continue rotating, and the next load entering from the feeding-chute B would back up on the previous one that could not escape and would flow inward over the inner edge of the plate $k$ to the central compartment of the loader and would continue to do so until the stoppage were removed. This inflowing of the extra load would prevent further feeding from the side chutes B, if said chutes be used to feed the loader, a feature of my spiral loader which is illustrated in Fig. 5, where a stoppage is shown at the discharge-opening of the spiral and the succeeding load is shown in the position which it would assume. Thus my spiral loader is adapted to deliver a certain load to successive buckets, and the slightly-expanding areas in the spiral discharge-passage, above referred to and shown in Figs. 5 and 11, make it unlikely that even large masses of material could stop the loading; but even if such stoppage should occur excessive loading of individual buckets is impossible for the reason just given.

Having thus fully described my invention, I claim—

1. The combination, in a conveyer, of traveling buckets; a bucket-loader; means for operating said loader to load material into the buckets; a conveying device for supplying material to said loader; and mechanism for driving said conveying device.

2. The combination, in a conveyer, of traveling buckets; a bucket-loader; a conveying device for supplying material to said loader; and means for operating said conveying device by a part of the main conveyer.

3. The combination in a conveyer of traveling buckets; a bucket-loader; means for operating said loader to load the buckets; a conveying device for supplying material to said loader; and means for operating said conveying device by the movement of said loader.

4. The combination, in a conveyer of traveling buckets; a bucket-loader; means for operating said loader to load material into the buckets; a screw conveyer for supplying material to said loader; and means for operating said screw conveyer.

5. The combination, in a conveyer, of traveling buckets; a bucket-loader; a screw conveyer for supplying material to said loader; and means for operating said screw conveyer by a part of the main conveyer.

6. The combination, in a conveyer, of traveling buckets; a bucket-loader; means for operating said loader to load the buckets; a screw conveyer for supplying material to said loader; and means for operating said screw conveyer by the movement of said loader.

7. The combination, in a conveyer, of traveling buckets; a rotary bucket-loader; means for rotating said loader to load material into the buckets; a conveying device for supplying material to said loader; and mechanism for driving said conveying device.

8. The combination, in a conveyer, of traveling buckets; a rotary bucket-loader; a conveying device for supplying material to said loader; and means for operating said conveying device by a part of the main conveyer.

9. The combination, in a conveyer, of traveling buckets; a rotary bucket-loader; a conveying device for supplying material to said loader; and means for operating said conveying device by the rotation of said loader.

10. The combination, in a conveyer, of traveling buckets; a rotary bucket-loader; means for rotating said loader to load material into the buckets; a screw conveyer for supplying material to said loader; and means for operating said screw conveyer.

11. The combination, in a conveyer, of traveling buckets; a rotary bucket-loader; a screw conveyer for supplying material to said loader; and means for operating said screw conveyer by a part of the main conveyer.

12. The combination, in a conveyer, of traveling buckets; a rotary bucket-loader; a screw conveyer for supplying material to said loader; and means for operating said screw conveyer by the rotation of said loader.

13. The combination, in a conveyer, of a loading-casing provided with a discharge-opening and with side openings; means for operating said casing to load the buckets; and means for supplying material into said side openings from each side of the conveyer.

14. The combination, in a conveyer, of traveling buckets; a bucket-loader; means for operating said loader to load material into the buckets; conveying devices for supplying material to said loader from each side of the conveyer; and means for operating said conveying devices.

15. The combination, in a conveyer, of a loader; conveying devices for supplying material to said loader from each side of the conveyer; and means for operating said conveying devices by a part of the main conveyer.

16. The combination, in a conveyer, of a loader; conveying devices for supplying material to said loader from each side of the conveyer; and means for operating said conveying devices by said loader.

17. The combination, in a conveyer, of a rotary loading-casing provided with side openings and with a discharge-opening and means for supplying material into the side openings of said casing from each side of the conveyer.

18. The combination, in a conveyer, of traveling buckets; a rotary loader; means for rotating said loader to load material into the buckets; conveying devices for supplying material to said loader from each side of the conveyer; and means for operating said conveying devices.

19. The combination, in a conveyer, of a rotary loader; conveying devices for supplying material to said loader from each side of the conveyer; and means for operating said conveying devices by a part of the main conveyer.

20. The combination, in a conveyer, of a rotary loader; conveying devices for supplying material to said loader from each side of the conveyer; and means for operating said conveying devices by the rotation of said loader.

21. The combination, in a conveyer, of traveling buckets; a bucket-loader; means for operating said loader to load material into the buckets; screw conveyers for supplying material to said loader from each side of the conveyer; and means for operating said screw conveyers.

22. The combination, in a conveyer, of a loader; screw conveyers for supplying material to said loader from each side of the conveyer; and means for operating said screw conveyers by a part of the main conveyer.

23. The combination, in a conveyer, of a loader; screw conveyers for supplying material to said loader from each side of the conveyer; and means for operating said screw conveyers by said loader.

24. The combination, in a conveyer, of traveling buckets; a rotary loader; means for rotating said loader to load material into the buckets; screw conveyers for supplying material to said loader from each side of the conveyer; and means for operating said screw conveyers.

25. The combination, in a conveyer, of a rotary loader; screw conveyers for supplying material to said loader from each side of the conveyer; and means for operating said screw conveyers by a part of the main conveyer.

26. The combination, in a conveyer, of a rotary loader; screw conveyers for supplying material to said loader from each side of the conveyer; and means for operating said screw conveyers by the rotation of said loader.

27. The combination, in a conveyer, of endless flexible connections; gravity-buckets suspended between said connections and spaced apart; a bucket-loader; means for operating said loader to load material into the buckets; a conveying device for supplying material to said loader; and mechanism for driving said conveying device.

28. The combination, in a conveyer, of endless flexible connections; gravity-buckets suspended between said connections and spaced apart; a bucket-loader; means for operating said loader to load the buckets; a conveying device for supplying material to said loader; and means for operating said conveying device by a part of the main conveyer.

29. The combination, in a conveyer, of endless flexible connections; gravity-buckets pivotally suspended between said connections and spaced apart; a rotary bucket-loader; means for rotating said loader to load material into the buckets; a conveying device for supplying material to said loader; and mechanism for driving said conveying device.

30. The combination, in a conveyer, of endless flexible connections; gravity-buckets pivotally suspended between said connections and spaced apart; a rotary bucket-loader; means for rotating said loader to load the buckets; a conveying device for supplying material to said loader; and means for operating said conveying device by a part of the main conveyer.

31. The combination, in a conveyer, of endless flexible connections; gravity-buckets suspended between said connections; a bucket-loader; means for operating said loader to load material into the buckets; a screw conveyer for supplying material to said loader; and means for operating said screw conveyer.

32. The combination, in a conveyer, of endless flexible connections; gravity-buckets suspended between said connections; a bucket-loader; a screw conveyer for supplying material to said loader; and means for operating said screw conveyer by a part of the main conveyer.

33. The combination, in a conveyer, of endless flexible connections; gravity-buckets suspended between said connections; a rotary bucket-loader; means for operating said loader to load material into the buckets; a screw conveyer for supplying material to said loader; and means for operating said screw conveyer.

34. The combination, in a conveyer, of endless flexible connections; gravity-buckets suspended between said connections; a rotary bucket-loader; a screw conveyer for supplying material to said loader; and means for operating said screw conveyer by a part of the main conveyer.

35. In a conveyer, the combination of endless flexible connections; gravity-buckets pivotally suspended between said connections; and two separate loading devices arranged to load separate alternate buckets of the conveyer.

36. In a conveyer, the combination with a series of buckets connected together, of two rotary loading devices arranged to load alternate buckets of the conveyer.

37. In a conveyer the combination with a series of buckets connected together, of a spiral loading apparatus, arranged to load alternate buckets of the conveyer.

38. In a conveyer, the combination with a series of buckets connected together, of two rotary spiral chutes arranged to load alternate buckets of the conveyer.

39. In a conveyer, the combination of a series of buckets connected together; two rotary loading devices; and means for rotating said loading devices by the conveyer to load alternate buckets.

40. In a conveyer, the combination of a series of buckets connected together; a spiral loading apparatus; and means for operating said loading apparatus by the conveyer to load alternate buckets.

41. In a conveyer, the combination of a series of buckets connected together; two rotary spiral chutes; and means for rotating said spiral chutes by the conveyer, to load alternate buckets.

42. In a conveyer, the combination of endless flexible connections; gravity-buckets pivotally suspended between said connections; means, operated by the conveyer, for loading alternate buckets with material; and means for tilting each alternate bucket upon its pivot and discharging the contents of the buckets at different points.

43. In a conveyer, the combination of a series of buckets connected together; a rotary loading apparatus arranged to load alternate buckets with material; and means for discharging the contents of alternate buckets at different points.

44. In a conveyer, the combination of a series of buckets connected together; a rotary loading apparatus arranged to load alternate buckets with material; means for rotating said loading apparatus by the conveyer; and means for discharging the contents of alternate buckets at different points.

45. In a conveyer, the combination of a series of buckets connected together; a spiral loading apparatus arranged to load alternate buckets with material; and means for discharging the contents of each bucket alternately at an appropriate point.

46. In a conveyer the combination of a series of buckets connected together; a spiral loading apparatus arranged to load alternate buckets with material; means for operating said spiral loading apparatus by the conveyer; and means for discharging the contents of each bucket alternately at an appropriate point.

47. In a conveyer, the combination of endless flexible connections; gravity-buckets pivotally suspended between said connections; two separate loading devices; means for operating said loading devices so that each device will load an alternate bucket; and means for tilting each alternate bucket upon its pivot and discharging the contents of the buckets at different points.

48. In a conveyer, the combination of endless flexible connections; gravity-buckets pivotally suspended between said connections; two separate loading devices; means for operating said loading devices by the conveyer so that each device will load an alternate bucket; and means for tilting each alternate bucket upon its pivot and discharging the contents of the buckets at different points.

49. In a conveyer, the combination of a series of buckets connected together; two rotary loading devices; means for rotating said loading devices so that each will load an alternate bucket; and means for discharging the contents of each bucket alternately at an appropriate point.

50. In a conveyer, the combination of a series of buckets connected together; two rotary loading devices; means for rotating said loading devices by the conveyer, so that each will load an alternate bucket; and means for discharging the contents of each bucket alternately at an appropriate point.

51. In a conveyer, the combination of a series of buckets connected together; two spiral loading-chutes; means for operating said spiral loaders so that each will load an alternate bucket; and means for discharging the contents of each bucket alternately at an appropriate point.

52. In a conveyer, the combination of a series of buckets connected together; two spiral loading-chutes; means for operating said spiral loaders by the conveyer, so that each will load an alternate bucket; and means for discharging the contents of each bucket alternately at an appropriate point.

53. The combination, in a conveyer, of traveling buckets; means for loading said buckets; means for discharging said buckets; a rotary receiver for receiving the discharged material; and means for operating said receiver by the conveyer.

54. The combination, in a conveyer, of traveling buckets; means for loading said buckets; means for discharging said buckets; a screw-conveyer receiving the discharged material; and means for operating said screw-conveyer by the main conveyer.

55. The combination, in a conveyer, of traveling buckets; a rotary loading-casing; means for rotating said casing to load material into the buckets; means for discharging said buckets; a rotary receiver for receiving the discharged material; and means for operating said receiver.

56. The combination, in a conveyer, of traveling buckets; a rotary loading-casing; means for rotating said casing to load the buckets; means for discharging said buckets; a screw conveyer, receiving the discharged material; and means for operating said screw conveyer.

57. The combination, in a conveyer, of flexible connections; gravity-buckets suspended from said connections; means for loading material directly into said buckets; means for tilting said buckets to discharge their contents; a rotary receiver, receiving the discharged material; and means for operating said receiver.

58. The combination, in a conveyer, of flexible connections; gravity-buckets suspended from said connections; means for loading material directly into said buckets; means for tilting said buckets to discharge their contents; a screw conveyer receiving the discharged material; and means for operating said screw conveyer.

59. The combination, in a conveyer, of flexible connections; gravity-buckets suspended from said connections; a rotary loading-casing; means for rotating said casing to load the buckets; means for tilting the buckets to discharge their contents; a rotary receiver for receiving the discharged material; and means for operating said receiver.

60. The combination, in a conveyer, of flexible connections; gravity-buckets suspended from said connections; a rotary loading-casing; means for rotating said casing to load the buckets; means for tilting the buckets to discharge their contents; a screw conveyer receiving the discharged material; and means for operating said screw conveyer.

61. The combination, in a conveyer, of traveling buckets; a bucket-loader; means for operating said loader to load material into the buckets a feeding-conveyer for supplying material to the loader; means for operating said feeding-conveyer; means for discharging the buckets; a receiving-conveyer; and means for operating said receiving-conveyer.

62. The combination, in a conveyer, of traveling buckets; a bucket-loader; means for operating said loader to load material into the buckets a feeding screw conveyer for supplying material to the loader; means for operating said screw conveyer; means for discharging the buckets; a receiving screw conveyer; and means for operating said receiving-conveyer.

63. The combination, in a conveyer, of traveling buckets; a rotary bucket-loader provided with a single discharge-opening on its periphery; and means for rotating said loader by the conveyer.

64. The combination, in a conveyer, of endless flexible connections; gravity-buckets pivotally suspended between said connections and spaced apart; a rotary bucket-loader provided on its periphery with a single discharge-opening; and means for rotating said loader to load material into the buckets.

65. The combination, in a conveyer, of traveling buckets and a rotary loading chute or casing provided on its periphery with a single discharge-opening.

66. The combination in a conveyer, of traveling buckets and a rotary loading chute or casing provided with a side opening, for receiving material, and with a single discharge-opening on its periphery.

67. The combination in a conveyer, of traveling buckets; a loading chute or casing provided on its periphery with a single discharge-opening; and means for rotating said loading-chute by the conveyer.

68. The combination in a conveyer, of traveling buckets; a loading chute or casing provided with a side opening for receiving material and with a single discharge-opening on its periphery; and means for rotating said loading-chute by the conveyer.

69. The combination, in a conveyer, of endless flexible connections; gravity-buckets pivotally suspended between said connections and spaced apart; a loading chute or casing provided with a side opening, for receiving material, and with a single discharge-opening on its periphery; and means for rotating said chute to load the buckets.

70. The combination, in a conveyer, of traveling buckets; a rotary spiral chute or casing having a diametrically-increasing spiral; means for supplying material into said spiral; and means for positively rotating said chute to load material into the buckets.

71. The combination, in a conveyer, of traveling buckets; a rotary spiral chute or casing having a diametrically-increasing spiral; means for supplying material into said spiral; and means for positively rotating said chute by the conveyer to load material into the buckets.

72. A loading device for conveyers, consisting of a chute or casing provided with an internal spiral integral therewith and means for positively rotating said chute.

73. The combination, in a bucket conveyer, of traveling buckets, and a rotary spiral loading-chute having a diametrically-increasing spiral and provided with teeth or projections for rotating the same.

74. The combination, in a conveyer, of a series of buckets; flexible connections between said buckets; and a rotary spiral loading-chute for loading material into said buckets provided with teeth or projections for engaging said flexible connections.

75. The combination, in a conveyer, of endless flexible connections; gravity-buckets pivotally suspended between said connections and spaced apart; and a rotary spiral chute or casing for leading material into said buckets.

76. The combination, in a conveyer, of endless flexible connections; gravity-buckets pivotally suspended between said connections and spaced apart; a spiral chute or casing for loading material into said buckets; and means for rotating said spiral chute by the conveyer.

77. The combination, in a conveyer, of endless flexible connections; gravity-buckets pivotally suspended between said connections and spaced apart; a spiral chute or casing for loading material into said buckets provided with a discharge-opening; means for supplying material into the side of said chute; and means for rotating said chute.

78. The combination, in a conveyer, of endless flexible connections; gravity-buckets pivotally suspended between said connections and spaced apart; a spiral loading chute or casing open at each side and provided with a discharge-opening; means for supplying material into said side openings; and means for rotating said loading-chute.

79. The combination, in a conveyer, of endless flexible connections; gravity-buckets pivotally suspended between said connections and spaced apart; a spiral loading chute or casing open at each side and provided with a discharge-opening; means for supplying material into each side of said loading-chute; and means for rotating said chute by the conveyer.

80. A rotary spiral loader provided with an expanding discharge-opening on its periphery.

81. A bucket-loader consisting of a spiral chute or casing provided with a side opening for receiving material and with an expanding discharge-opening on its periphery.

82. A bucket-loader consisting of a chute or casing provided with an opening in its side, for receiving material, and with an expanding discharge-opening on its periphery.

83. A bucket-loader consisting of a rotary casing, having an opening at each side for receiving material.

84. A bucket-loader consisting of a rotary spiral chute, having an opening at each side for receiving material.

85. A bucket-loader consisting of a rotary casing provided with a hollow neck of different diameter from the body of the loader.

86. A bucket-loader consisting of a rotary casing provided with a hollow neck of different diameter from the body of the loader; and means for supporting said casing by said neck.

87. A bucket-loader consisting of a rotary casing provided with a hollow neck at each side.

88. A bucket-loader consisting of a rotary casing provided with a hollow neck at each side; and means for supporting said necks.

89. A bucket-loader consisting of a spiral chute or casing provided with a hollow neck of different diameter from the body of the loader.

90. A bucket-loader consisting of a spiral chute or casing provided with a hollow neck of different diameter from the body of the loader, and means for supporting said neck.

91. A bucket-loader consisting of a spiral chute or casing provided with a hollow neck at each side.

92. A bucket-loader consisting of a spiral chute or casing provided with a hollow neck at each side; and means for supporting said necks.

93. A bucket-loader consisting of a rotary casing provided with a hollow neck; in combination with a feeding device entering said neck.

94. A bucket-loader consisting of a rotary casing provided with a hollow neck at each side; in combination with feeding devices entering said necks.

95. A bucket-loader consisting of a rotary spiral chute or casing provided with a hollow neck of different diameter from the body of the loader; in combination with a feeding device entering said neck.

96. A bucket-loader consisting of a rotary spiral chute or casing provided with a hollow neck at each side; in combination with feeding devices entering said necks.

97. The combination, in a bucket conveyer, of a rotary bucket-loader provided with a hollow neck of different diameter from the body of the loader, and a roller-bearing for supporting said neck.

98. The combination, in a bucket conveyer, of a rotary bucket-loader provided with a hollow neck of different diameter from the body of the loader at each side, and roller-bearings for supporting said necks.

99. The combination with a bucket-loader having teeth or projections for operating the same, of means for throwing one of said projections out of gear with the operating devices.

100. The combination with a rotary bucket-loader having teeth or projections for rotating the same, of means for throwing one of said teeth or projections out of gear with the operating devices.

101. The combination in a conveyer of traveling buckets; flexible connections; a bucket-loader provided with teeth or projections for engaging said connections; and means for throwing one of said teeth or projections out of gear with said connections.

102. The combination, in a conveyer of traveling buckets; flexible connections; a rotary bucket-loader having teeth or projections for engaging said connections; and means for throwing said teeth or projections out of gear with said connections.

103. The combination of a bucket-loader provided with teeth or projections, one of said teeth being pivoted; and means for rotating said pivoted tooth and thereby throwing it out of gear with the operating devices.

104. The combination of a rotary bucket-loader having a side piece provided with teeth or projections, one of said teeth being pivoted to said side piece; and means for rotating said pivoted tooth and thereby throwing it out of gear with the operating devices.

105. In a conveyer, the combination of a series of buckets spaced apart; flexible connections between the buckets; track-wheels; and means for supporting such flexible connections between the track-wheels, at desired points in the track.

106. In a conveyer, the combination of a series of buckets spaced apart; flexible connections between the buckets; track-wheels; and a supporting-guide for said flexible connections between the track-wheels.

107. In a conveyer, the combination of a conveyer-chain; supports for said chain; a loading device; and a supporting-guide for holding said chain to the operating-line of the loading device between the chain-supports.

108. In a conveyer, the combination of a conveyer-chain; supports for said chain; a loading device; and rails or bars beneath said loading device for supporting said chain between the chain-supports.

109. In a conveyer, the combination of a conveyer-chain; a loading device; and a supporting-guide for said chain consisting of two parallel bars, having a channel between them.

110. In a conveyer, the combination of a conveyer-chain; supports for said chains; a loading device provided with teeth or projections for engaging said chain; and a guide for supporting said chain between the chain-supports and insuring its engagement by said teeth.

111. In a conveyer, the combination of a conveyer-chain; supports for said chain; a rotary loading device provided with teeth or projections for engaging said chain; and a guide for supporting said chain between the chain-supports and insuring its engagement by said teeth.

ARTHUR J. FRITH.

Witnesses:
JOHN S. WYTH,
H. L. VAN ZILE.